Jan. 16, 1923.

B. F. AUGUSTINE.
ROTARY TWO-CYCLE SUPERINDUCTION ENGINE.
FILED MAR. 8, 1918.

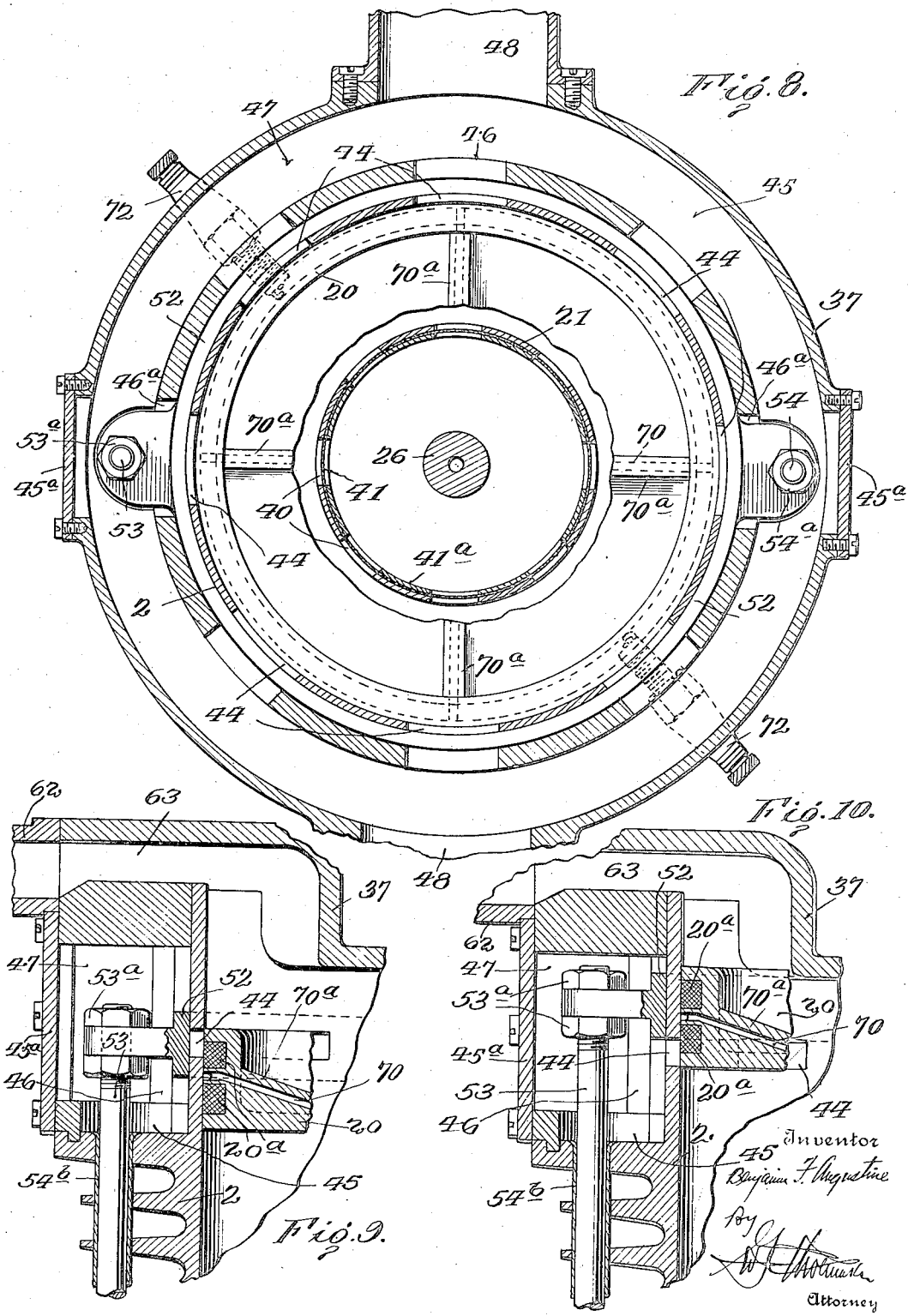

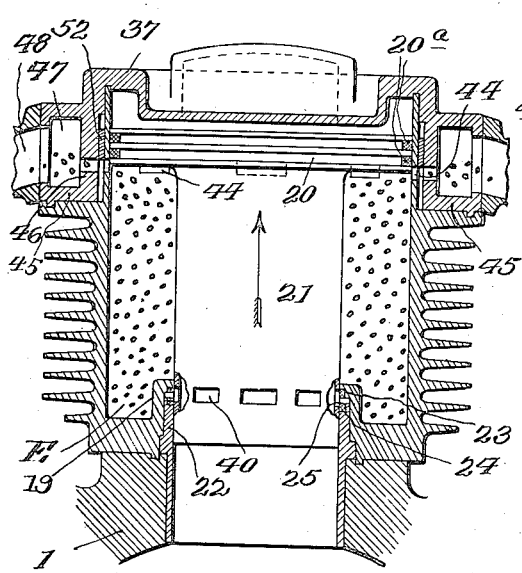
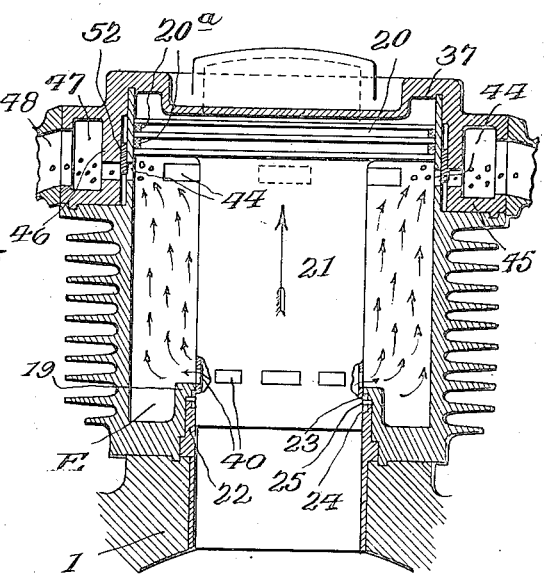
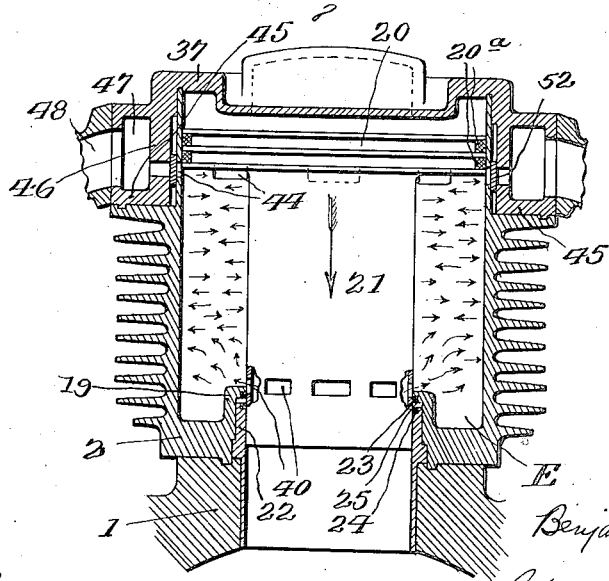

Jan. 16, 1923.

B. F. AUGUSTINE.
ROTARY TWO-CYCLE SUPERINDUCTION ENGINE.
FILED MAR. 8, 1918.

Witness
Albert Poplens

Inventor
Benjamin F. Augustine
By
Attorney

Patented Jan. 16, 1923.

1,442,596

UNITED STATES PATENT OFFICE.

BENJAMIN F. AUGUSTINE, OF BUFFALO, NEW YORK, ASSIGNOR TO AUGUSTINE AUTOMATIC ROTARY ENGINE COMPANY, OF BUFFALO, NEW YORK, A CORPORATION OF NEW YORK.

ROTARY TWO-CYCLE SUPERINDUCTION ENGINE.

Application filed March 8, 1918. Serial No. 221,256.

*To all whom it may concern:*

Be it known that I, BENJAMIN FRANKLIN AUGUSTINE, a citizen of the United States, residing at Buffalo, in the county of Erie and State of New York, have invented certain new and useful Improvements in Rotary Two-Cycle Superinduction Engines, of which the following is a specification.

The invention relates to new and useful improvements in gas engines and more particularly to a gas engine of the two cycle type.

An object of the invention is to provide a rotary engine of the above character having a crank, a plurality of radially disposed cylinders, a piston in each cylinder and a connecting rod connecting the respective pistons with the crank, with associated devices whereby the expanding gases for rotating the engine operate against the inner face of the piston and with the centrifugal force acting thereon rather than against said centrifugal force, thereby greatly increasing the efficiency of the engine and also maintaining a perfect balance in the opposed pistons.

A further object of the invention is to provide an engine of the above character wherein each piston is provided with an inwardly projecting cylindrical portion which serves as the inner wall of the expansion chamber, as a housing for the connecting rod and connection to the piston and which carries and controls the intake ports through which the fuel gas passes to the expansion chamber.

A still further object of the invention is to provide a gas engine of the two cycle type, which gas engine includes intake ports for admitting the fuel gases and exhaust ports through which the burnt gases are expelled and controlling devices for the exhaust ports, which are timed so as to close before the intake ports are closed, thereby effecting super-induction of the fuel gases and high volumetric efficiency under all conditions.

A further object of the invention is to provide a gas engine of the two cycle type having a plurality of cylinders wherein the piston divides each cylinder into an inner expansion chamber located between the inner face of the piston and the inner end of the cylinder and an outer pumping chamber located between the outer face of the piston and the outer end of the cylinder.

Another object of the invention is to provide a gas engine of the two cycle type wherein the piston is constructed and arranged so that the inner and outer faces thereof are subjected to the cool fuel gases prior to the entrance of the fuel gases into the expansion chamber, whereby the heat tending to accumulate in the piston are utilized for gasifying the heavier particles of fuel gas and the piston is thereby kept from overheating.

Still another object of the invention is to provide a gas engine of the two cycle type having inlet openings disposed about one end of the cylinder and relatively large exhaust ports disposed about the other end of the cylinder with means extending centrally through the expansion chamber, whereby the tendency of the inrushing gases to cyclone and intermix with the burnt gases, is avoided.

A still further object of the invention is to provide an engine of the above character wherein the piston has an inner extending cylindrical portion which forms the inner wall of the expansion chamber and reduces the area of the expansion chamber, so that the piston area of the pumping chamber is greater than the piston area of the expansion chamber.

Another object of the invention is to provide a two cycle gas engine having a plurality of cylinders with ports adjacent the outer end of each cylinder, a piston in each cylinder dividing the same into an inner expansion chamber and an outer pumping chamber with means for controlling said exhaust ports whereby said exhaust ports are covered when the outer end of the cylinder is used as a pumping chamber and whereby said exhaust ports may be uncovered to permit the exhaust gases to be expelled therethrough when the piston is at the end of the expansion stroke.

A still further object of the invention is to provide a gas engine with a piston construction wherein the piston has a sliding bearing on the wall of the cylinder at both the inner and outer ends of the expansion chamber, whereby the wear between the piston and the cylinder wall is reduced to a minimum and the size or the extent of contact surface between the piston and the cylinder wall is also reduced to a minimum, thereby reducing the friction incident to the travel of the piston.

These and other objects will in part be obvious and will in part be hereinafter more fully disclosed.

In the drawings which show by way of illustration one embodiment of the invention;

Fig. 8 is a sectional view through one of the cylinders in a plane at right angles to the longitudinal axis of the cylinder and showing the exhaust ports, the wall ring therefor, and also the intake ports;

Fig. 9 is an enlarged sectional view through the upper portion of a cylinder at one side thereof, showing the piston as just having closed the exhaust port and the sleeve for closing the exhaust port about to move to uncover the same;

Fig. 10 is a similar view but showing a sleeve moved so as to uncover the exhaust port and the piston just reaching the point where the exhaust port will be uncovered thereby;

Fig. 11 is a view showing more or less diagrammatically and in section the position of the piston just as the exhaust gases are released;

Fig. 12 is a similar view but showing the intake ports open and the cylinder as fully scavenged of the burnt gases and the sleeve just about reaching the point for closing the exhaust ports;

Fig. 13 is a similar view but showing the exhaust ports closed by the sleeve and the super-induction of the gases in the cylinder, the intake ports just about reaching the point of closing;

Figure 1:
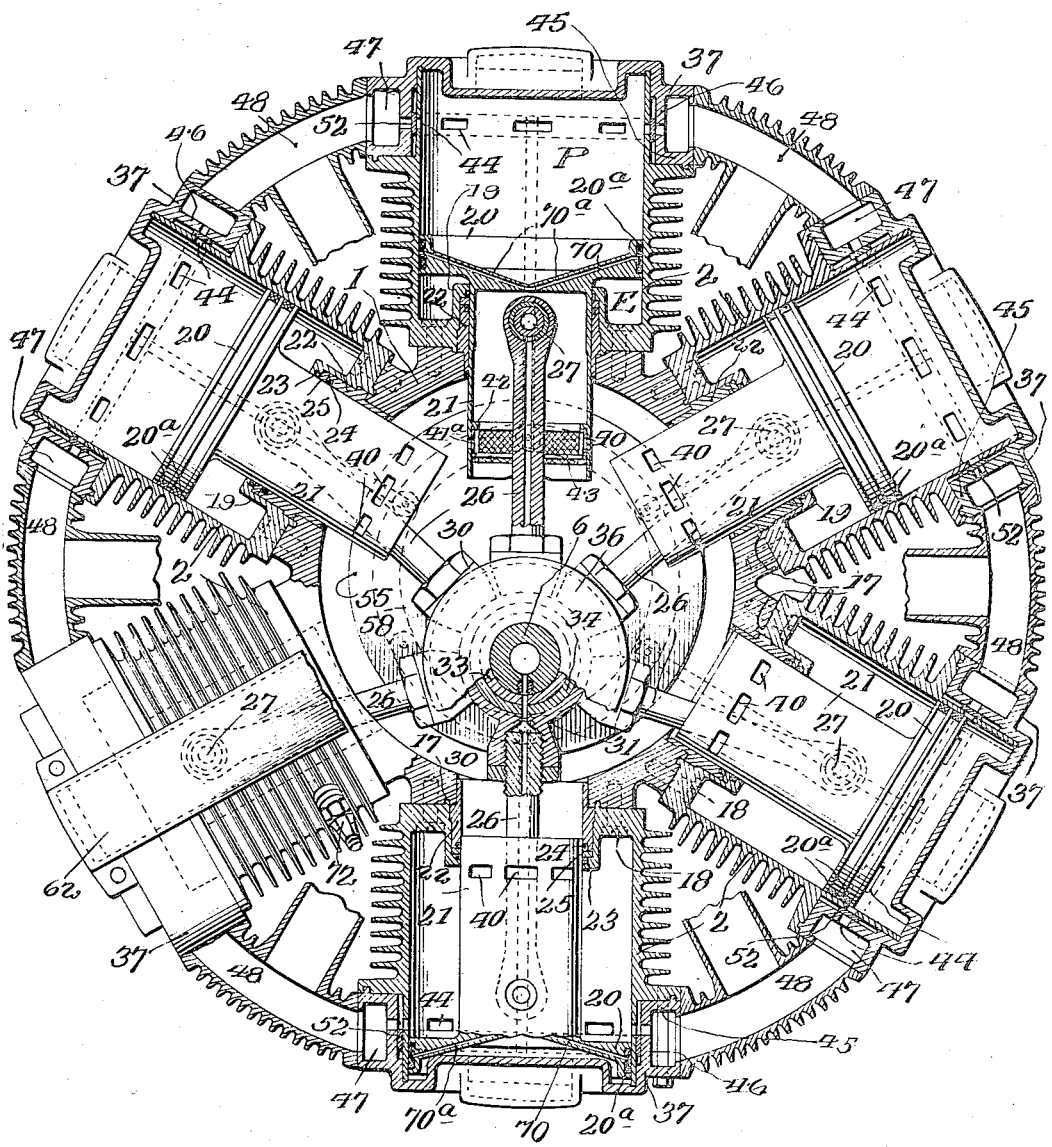
Fig. 1 is a sectional view through the engine in a plane at right angles to the axis of the driving shaft and centrally through the cylinders.
Figure 2:
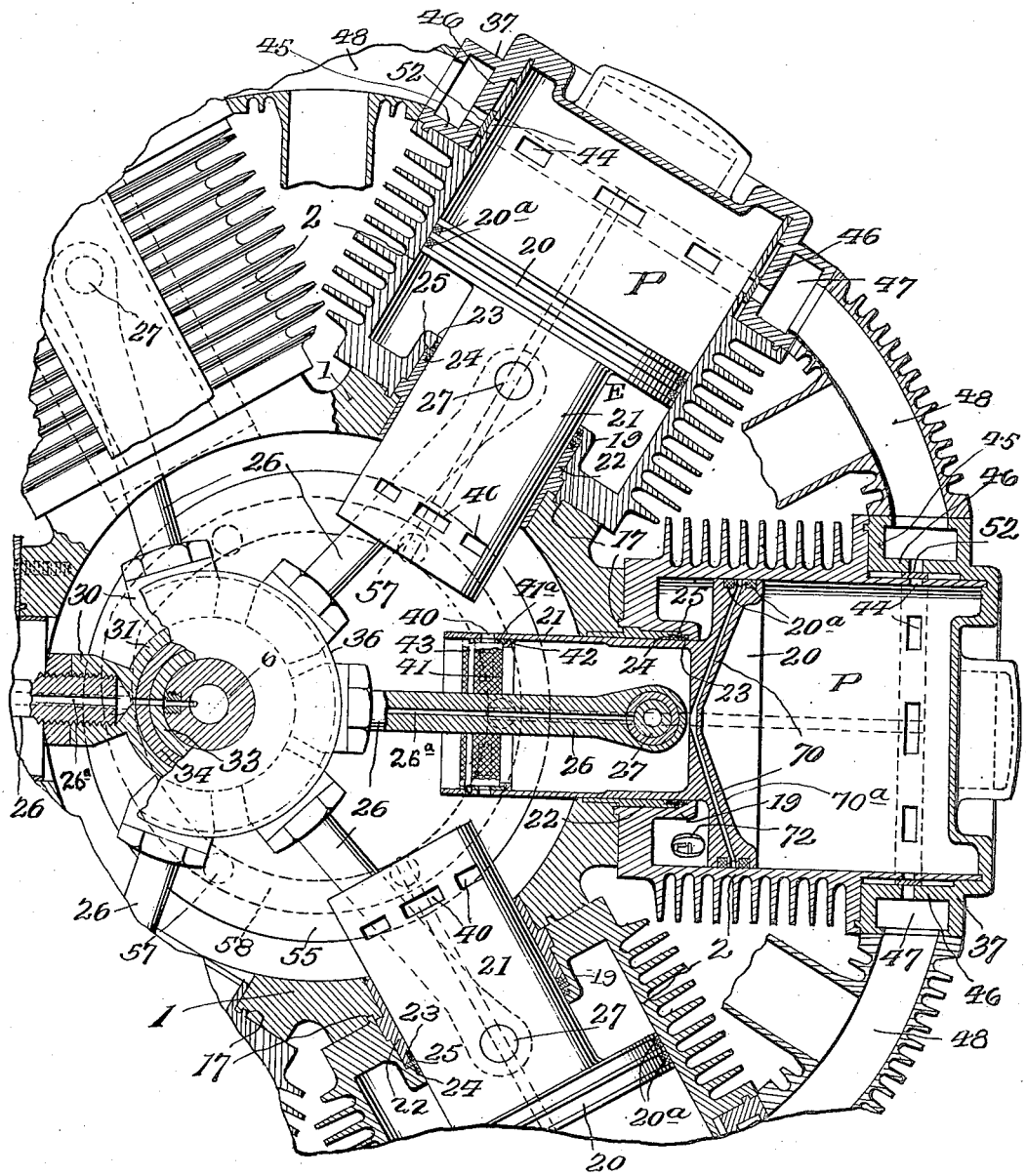
Fig. 2 is an enlarged view partly in section and partly in elevation at right angles to the axis of the driving shaft and through several of the cylinders and the crank shaft.

I have shown the invention as embodied in a two cycle rotary cylinder engine wherein the cylinders are radially disposed about a fixed crank. Each cylinder is provided with a piston which divides the cylinder into an inner expansion chamber and an outer pumping chamber. Each piston is provided with a cylindrical projection extending inwardly. The inner end of the cylinder is closed except for an opening in which said cylindrical projection fits and slides. The connecting rod extends into said cylindrical portion. This cylindrical portion forms the inner wall of the expansion chamber and reduces the area of the piston exposed to the expanding gases as compared to the area of the piston utilized for pumping the gases. It also provides a piston construction wherein the piston has two bearing points, one at each end of the expansion chamber. The cylindrical projection is also provided with intake ports which permit the explosive gases to pass from the crank casing through into the expansion chambers of the cylinders. The burnt gases are expelled through exhaust ports at the outer ends of the cylinders and these exhaust ports are closed by a sleeve which covers the exhaust ports when the outer end of the cylinder is used as a pumping chamber and which uncovers the exhaust ports as the piston reaches the end of its expansion stroke, so as to permit the burnt gases to pass out through the same. The sleeve is timed so as to close the exhaust ports a little before the intake ports close. Fuel gases are drawn into the pumping chambers in succession from the carburetor and are transferred by the pistons operating in the pumping chambers to the crank casing, where said gases are placed under compression; the degree of compression depending upon the throttle condition of the carburetor which controls the amount of gas drawn in and delivered by the pumps to the crank casing. The sleeve closes the exhaust ports before the intake ports are closed, so as to effect a super-induction of the fuel gases and thereby maintain a high volumetric efficiency under all conditions. The force of the expanding gases is against the inner end of the cylinder and the inner face of the piston. This tends to hold the cylinder seated and also permits the cylinder to be made very light. The cylinders of the engine are fired one after the other in rotation, which permits a very simple ignition system to be used. The spark plugs are located adjacent the intake ports so that the fuel gases scavenge the spark plugs and the spark plugs are always surrounded by rich fresh fuel gases even when the engine is throttled and running slowly.

Referring more in detail to the drawings, my improved gas engine consists of a casing 1, on which is mounted six radially disposed cylinders 2. These cylinders are spaced at equal angles about the center of the crank casing. It will be understood of course that the number of cylinders is not important and may be varied without departing from the spirit of my invention. The crank casing rotates in suitably mounted journal bearings carried on the supporting frame indicated at 3 and 4. Fixed to the frame section 4 is a shaft 5, which is formed with a crank 6. This crank is offset from the axis of the fixed shaft 5. The extreme inner end 7 of the fixed shaft 5 is made separable from the inner end of the crank.

The casing 1 is formed of a cylindrical body portion 8 and end caps 9 and 10. These end caps are bolted to the cylindrical body portion 8 by suitable bolts 11. Fixed to the end cap 10 is the driving shaft 12. This driving shaft rotates with the casing. Ball bearings 13 are disposed between the shaft 12 and the end portion of the fixed shaft 7. The driving shaft 12 is mounted in ball bearings 14 carried by the frame section 3. Thrust bearings 15 and 16 are also provided. These thrust bearings are disposed between moving parts of the engine and fixed parts carried by the frame section 3.

Each cylinder is formed with an annular rib 17 which seats in a suitable groove formed in the body portion 8 of the casing and the cylinder is bolted to the casing by bolts 18. The cylinder at its inner end is partly closed and as shown, has an outwardly extending portion 19. Located in each cylinder is a piston 20. Each piston has an inwardly projecting cylindrical portion 21. This cylindrical portion 21 fits and slides in the portion 19 formed as a part of the inner end of the cylinder. A sleeve 22 seats against the outer face of the body portion 8 of the casing and this sleeve 22 also receives and fits the cylindrical portion 21 carried by the piston. At the outer end of the sleeve 22 are two packing rings 23 and 24. Between these packing rings 23 and 24 is a metal ring 25. These parts are assembled by slipping the sleeve 22 in place, then placing the packing rings and seating the cylinder which overlaps the packing rings and the sleeve 22 so that when the cylinder is bolted in place, these parts will all be held assembled by the bolts holding the cylinder.

The piston 20 has suitable packing rings 20ª. It will be noted that the piston slides on two bearings, one of which is at one end of the expansion chamber and the other of which is at the other end of the expansion chamber. As the piston travels, the connecting rod assumes a position at an angle to the longitudinal center of its cylinder and this causes more or less of a side thrust or twisting of the piston in the cylinder. By my improved construction however, where the piston has a two point bearing one at each end of the expansion chamber, this side thrust or lateral twist in the piston is taken care of with little wear of the piston on the cylinder wall. Furthermore, by this two point bearing at each end of the expansion chamber, I am able to reduce to a minimum the size or extent of contact surface between the piston and the cylinder wall and thereby reduce the friction incident to the travel of the piston.

Figure 14:
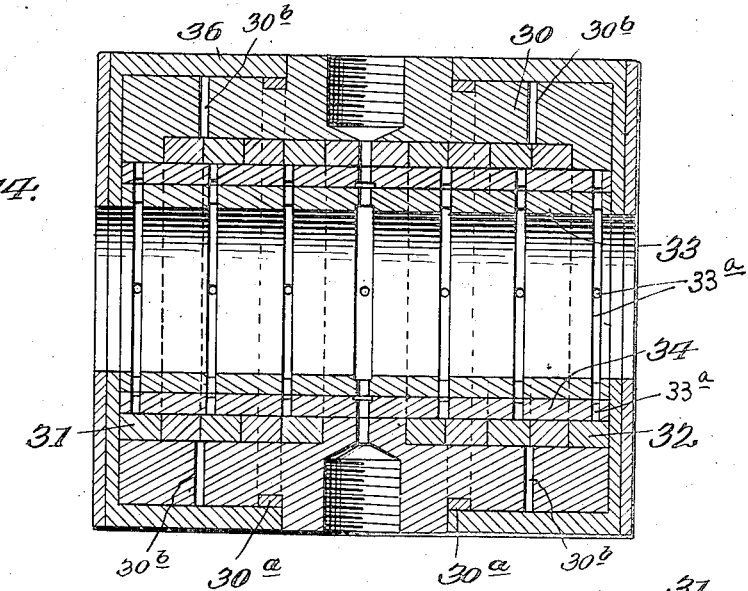
Fig. 14 is a sectional view longitudinally of the crank connection between the connecting rods and the fixed crank.
Figure 15:
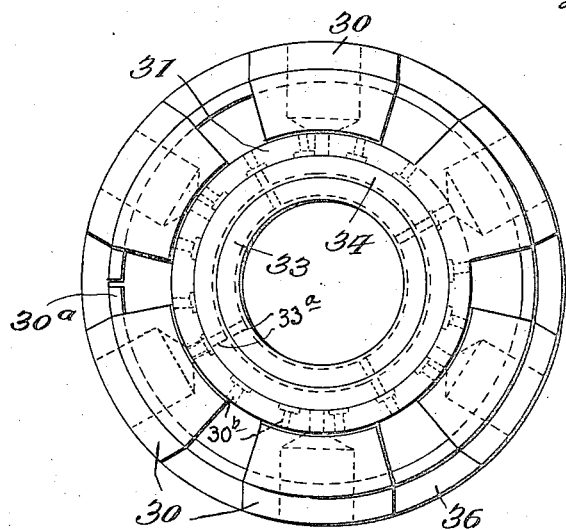
Fig. 15 is an end elevation of the same showing the oiling features in dotted lines, the end cups being removed.
Figure 16:
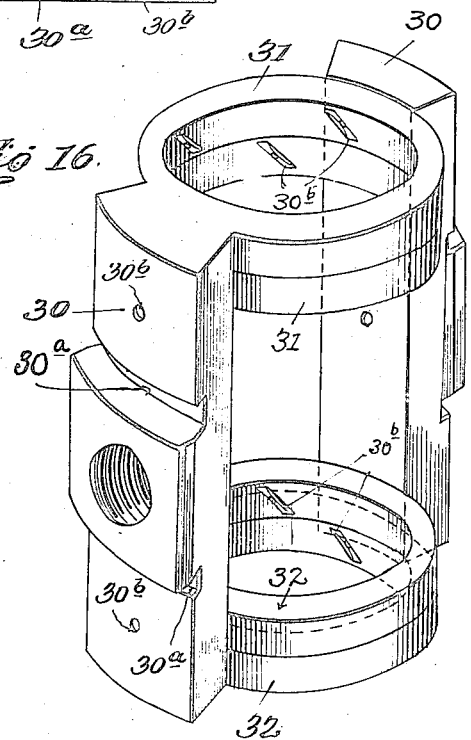
Fig. 16 is a perspective view of two of the crank elements showing how these parts may be nested together.

Each piston is connected to the crank 6 by a connecting rod 26. Said connecting rod is attached to a wrist pin 27 mounted in inwardly projecting bearings 28 carried by the piston and held in place by cap plates 29. The inner end of the connecting rod is attached to the crank 6 by an improved connection, which consists of a cross bar 30 having formed integral therewith spaced rings 31 and 32. These rings are attached to their respective cross bars so that they may be nested together (see Figures 14 to 16). Inside of the nested rings are two floating sleeves 33 and 34, which take a portion of the pull exerted by the connecting rods on the fixed crank. Each cross bar at each side of the connecting rod is provided with a groove 30ª in its outer face. Compression rings 35 are slipped over the ends of the cross bars after the parts are assembled and snap into these grooves. Cups 36 are then slipped over the ends of the cross bars and over the compression rings. These rings engage their respective cups and form oil pockets for retaining the lubricating oil within the cups. The pull on the connecting rod causes the cross rod carried thereby, to engage the cups and the cups are drawn against the opposed cross bars, thus distributing the load and preventing undue wear on all parts.

The outer end of each cylinder is closed by a cylinder head 37. These cylinder heads are bolted to the ends of the cylinder by suitable bolts 38. The piston 20 divides each cylinder into an expansion chamber E and a pumping chamber P. By the term expansion chamber, I mean the chamber in each cylinder in which the fuel gases are received, compressed, ignited and expanded, thus causing the running of the engine. It will be noted that the cylindrical portion 21 serves as the inner wall of the expansion chamber and that this cylindrical portion reduces the piston area at the inside of the piston which is subjected to the expanding gases as compared to the piston area at the outside of the piston which cooperates with the pumping chamber in delivering the gases to the crank casing, as will be described hereinafter more in detail.

Fuel gas is admitted to the expansion chambers of the cylinders through inlet ports 40 which are formed in the cylindrical portion 21 of each piston. These ports are covered by a screen 41. The screen seats against a ring 42 and is held in place by a split expanding ring 43 and is protected by an inner sleeve 41ª having openings registering with the intake ports. Inasmuch as the cylinders rotate, centrifugal force will operate also to hold the screen seated against the ring 42. The purpose of this screen is to prevent any possible back firing into the crank casing and pre-ignition of the gases therein. The exhaust gases are expelled through exhaust ports 44. These exhaust ports are located adjacent the outer end of the cylinder and are formed in the side wall thereof.

The inlet ports are disposed about the cylindrical projecting portion 21 so that fuel gas is admitted at all sides thereof. The exhaust ports 44 are also similarly disposed about the end of the cylinder. The exhaust ports are larger in area than the intake ports. The cylindrical portion 21 extends centrally through the expansion chamber at all times and this prevents the intake gases from cycloning and intermixing with the burnt exhaust gases, and insures a complete and quick scavenging of the cylinders.

The cylinder head 37 extends beyond the side walls of the cylinder and is provided with an inwardly projecting portion 45, which is formed with a chamber 47. The inner wall 46 of this inwardly projecting portion is spaced from the end portion of the cylinder wall. The chamber 47 is connected to exhaust pipes 48 which lead to an annular chamber 49 in the end cap 9. This end cap rotates with the casing. An opening 50 leads from the annular chamber 49 to the exhaust manifold 51 which is held from rotation. This manifold has a gas tight connection with the end cap 9. Located in the space between the wall 46 and the wall of the cylinder 2, is a sleeve 52 which controls the exhaust ports. This sleeve has outwardly projecting ears or lugs which are perforated to receive respectively rods 53 and 54. Nuts 53ª and 54ª are threaded onto the rods at the inner and outer sides of the ears or lugs on the sleeve and serve as a means for adjusting the sleeve on the rods. The wall 46 is slotted at 46ª, so that these ears project through into the exhaust chamber 47. The inner part of the head portion 45 is cut away so that when the bolts 38 holding the cylinder head are removed, the cylinder head with the portion 45 may be removed from the flange on the cylinder to which the cylinder head is bolted. The cylinder head is provided with openings at the opposite sides thereof directly in line with the ears or lugs carried by the sleeve 52 and plates 45ª close these openings. By removing the plates 45ª, access may be readily had to the nuts 53ª and 54ª so as to adjust the sleeve on the rods and thereby vary as desired, the time when the sleeve will uncover the exhaust ports through the operation of the cams which actuate the rods. The rods 53 and 54 extend through tubes 53ᵇ and 54ᵇ respectively and through suitable stuffing boxes 53ᶜ and 54ᶜ respectively into the crank casing. The rods 54 are operated by a box cam 55, which is fixed to the crank 6 and held from rotation on the crank. The rod 53 is operated by a similar box cam 56. At the inner end of each rod are rollers 57 which run in the cam grooves 58 in the box cams. The shaping of the cams which operate these rods will be described later. It may be stated that these cams operate to force the sleeves positively in and out on the cylinders so as to cover the exhaust ports or uncover the exhaust ports, as may be required in the operation of the engine. The timing of the cams operating the rods is such, that the sleeve is not moved until the piston reaches a point where the exhaust ports are substantially covered by the piston, and then the sleeve is moved outward to fully uncover the exhaust ports before the inner edge of the piston uncovers the exhaust ports, so that the release of the exhaust gases is timed by the piston and the sleeve is moved during the period of timing when the exhaust ports are covered. Therefore, there is no pressure whatever exerted against the sleeve when it is shifted. This prevents all possible wear on the sleeve and maintains a very tight vapor joint when said sleeve operates to cover the ports so that the outer end of the cylinder may be used as a pumping chamber. The sleeve is also used to close the exhaust ports before the piston returns and therefore, may be timed so as to close said exhaust ports before the intake ports are closed, whereby super-induction is effected. In Figure 9 I have shown the piston at the point where the exhaust ports are covered and the sleeve 52 is just beginning its outward movement. In Figure 10 the sleeve has completed its outward movement and the exhaust ports are still covered by the piston.

Figure 3:
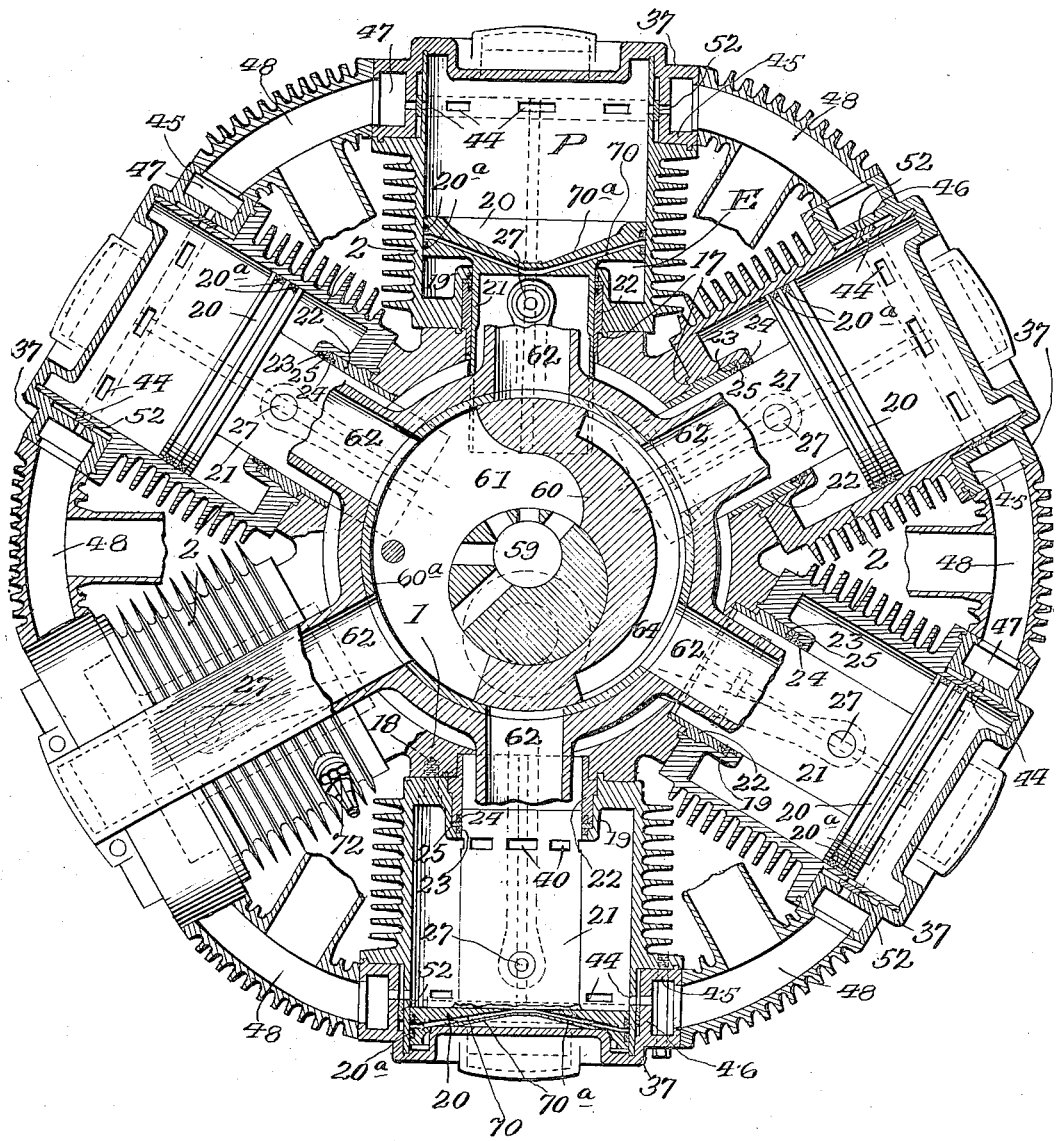
Fig. 3 is a view partly in section on the line 3—3 of Fig. 4, showing some of the cylinders in section and some of the cylinders in elevation.
Figure 4:
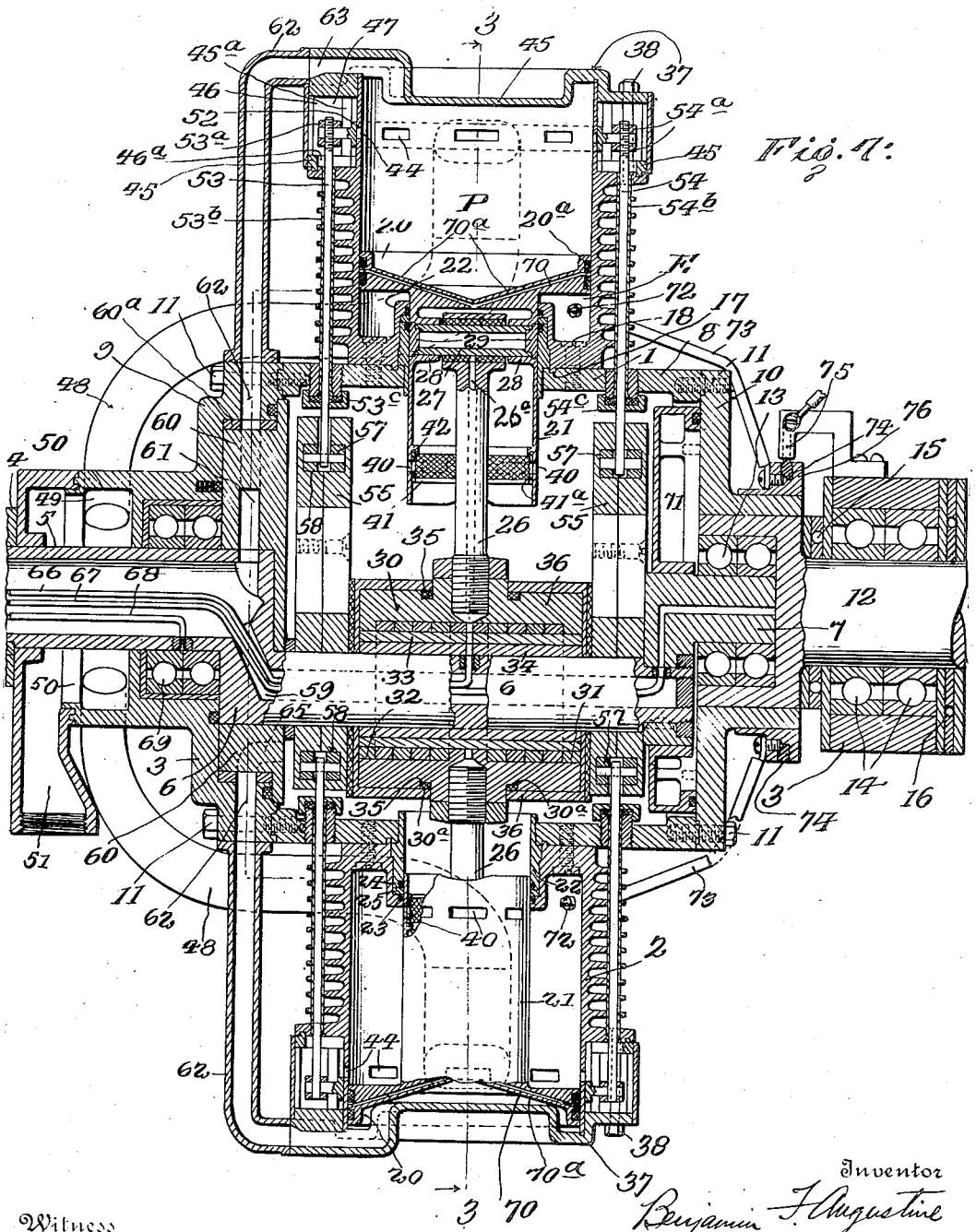
Fig. 4 is a sectional view through the engine in a plane containing the axis of the driving shaft.
Figure 5:
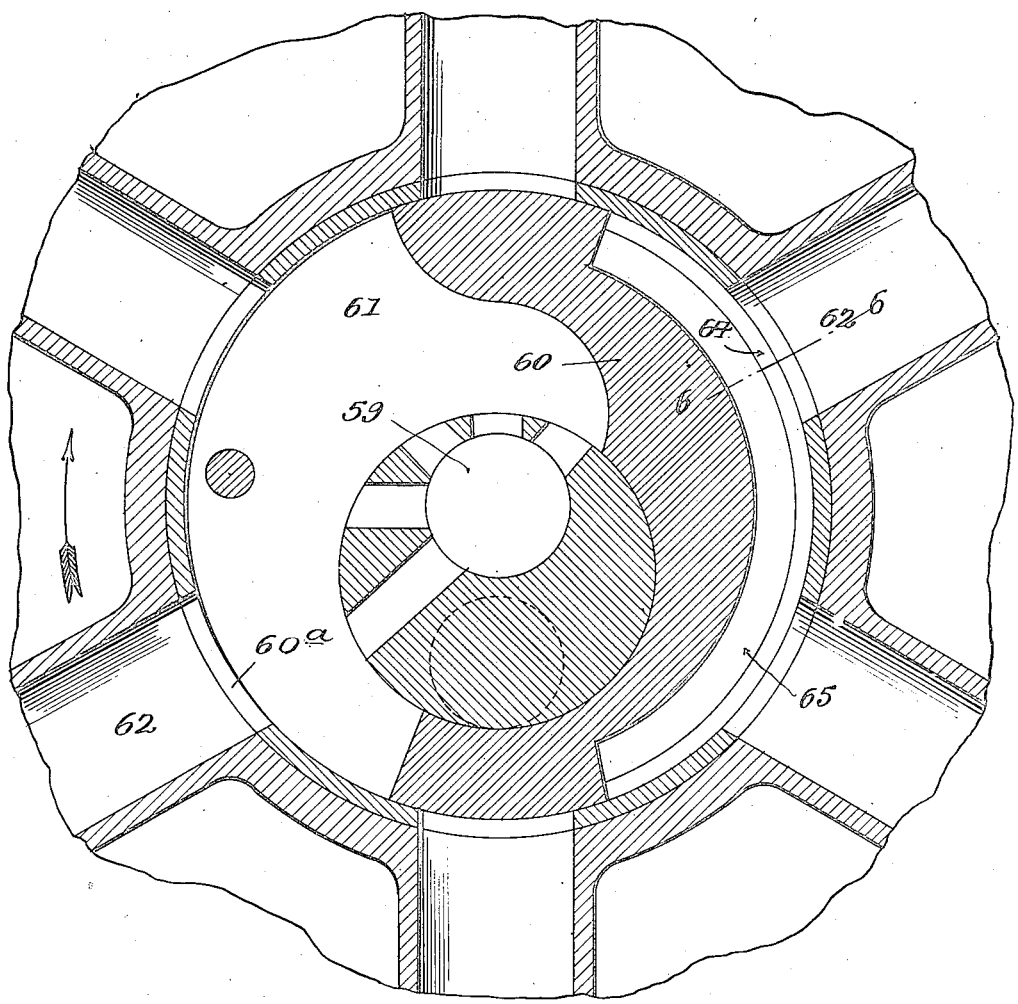
Fig. 5 is an enlarged sectional view through the controlling disc valve and the parts immediately associated therewith.
Figure 6:
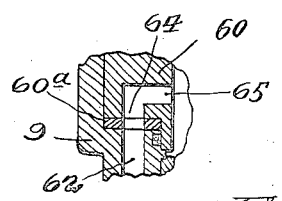
Fig. 6 is a detail in section through a portion of the disc valve, the wear ring and the surrounding casing.

The explosive gases are drawn into the pumping chambers by the movement of the pistons 20 and are transferred by these pistons to the crank casing. The gases are led from a carburetor into the chamber 59. The shaft 5 is made hollow to provide this chamber 59. Housed in the end plate 9 is a valve disc 60. This valve disc 60 is shown in detail in Fig. 3 of the drawings. Said valve disc is cut away so as to form an opening or a channel 61 which is adapted to connect the chamber 59 receiving the gases from the carburetor with pipes 62, which extend outwardly along each cylinder and connect respectively with a passage 63 in the head of each cylinder. This passage 63 opens directly into the pumping chamber in the outer end of the cylinder. It will be noted from Figs. 3 and 5 that this opening or channel 61 is of sufficient angular extent so as to always connect with two of the pipes 62 and sometimes with three of the pipes. These pipes which convey the explosive mixture from the carburetor to the pumping chambers also operate at times to convey the explosive mixture from the pumping chamber to the crank casing. On the opposite side of the valve disc from the opening or channel 61 is a discharge channel 64 which is also of angular extent, so as to always connect with two of the pipes 62 and sometimes with three of said pipes. The solid portion of the disc between the receiving channel 61 and the discharge channel 64 is of sufficient extent so as to prevent two pipes 62 from being simultaneously connected with the intake side of the disc valve and the discharge side thereof. When the solid portions dividing the intake side of the valve from the discharge side of the valve is directly opposite opposed pipes 62 as shown in Figures 3 and 5 the piston in the cylinders connected to said pipes are at a point in the revolution of the engine, where said pistons are at substantially a state of rest and the pumping chambers associated therewith are neither under suction or discharge. There is no pressure therefore of the gases in these pipes 62 at this time. When however, the pistons are at their working travel, either drawing in gas or discharging gas, these solid portions of the valve disc are at points so as to become solid abutments to prevent escape of gases from the discharge side of the valve to the intake side thereof and also to prevent the pumps from drawing gas from the crank casing. The opening or channel 64 opens at 65 through the side of the disc into the crank casing (see Figure 6).

This disc valve is held from movement and is so positioned that the following action takes place. When the piston in a cylinder is moving relative to the cylinder away from the head of the cylinder, the chamber 59 leading to the carburetor has an open connection through the pipes 62 with the cylinder at its outer end, so that fuel gas is drawn into the pumping chamber. The movement of the pistons relative to the cylinders and the area of the pumping chamber is fixed, but the amount of gas drawn in will of course be determined by the throttled condition of the carburetor. This valve disc is also so positioned that when the pistons are moving outwardly relative to the cylinder the pipes 62 leading from such cylinders have an open connection through the passage 65 with the crank casing, so that the gas drawn in during the first part of the cycle of movement of a piston is delivered by the outward movement of the piston through a pipe 62 to the crank casing. The fuel gas in the crank casing may be put under more or less compression by the pumps, the degree of which is regulated by the throttled condition of the carburetor and therefore the volume of gas handled by the pumps. In other words, if the carburetor is wide open and the pumping chambers are each receiving a full volume of gas, then the gas will be delivered to the crank casing in sufficient volume to place the same under pressure greater than atmospheric pressure.

Between the valve disc and the end cap is a wear ring 60$^a$ which is provided with ports registering with the openings leading to the pipes 62. If this ring 60$^a$ should wear, a new ring can be readily substituted therefor so that gas tight connection may be maintained.

While the pumping chambers are operating to draw in and deliver the gas to the crank casing, the sleeve 52 covers the exhaust ports and prevents the exhaust gases from being drawn into the cylinders and also the fuel gases from being forced out through these exhaust ports. As above noted, the cams for operating these sleeves 52 are so timed that the exhaust ports will be covered slightly before the intake ports close through the inward relative movement of the cylindrical portion 21 of the piston and therefore, not only do the gases in the crank casing rush into the cylinders to assist in expelling the exhaust gases, but the closing of the exhaust port will effect superinduction of the explosive gases in the cylinders before the pistons move to compress the gases. I am thus enabled to obtain a large volume of explosive gas in each cylinder regardless of the atmospheric conditions in which the engine may be operating. In Figure 11 I have shown the gases at substantially full expansion and the exhaust ports just opening to permit escape of the burnt fuel gases. In Figure 12 I have shown the intake ports fully opened and the burnt gases forced out of the expansion chamber by the inrushing fresh fuel gases. The sleeve is moving and just about to close the exhaust ports. In Figure 13 I have shown the exhaust ports closed and the super-induction of the fresh fuel gases by the position of the arrows. The intake ports are not yet closed. My engine is especially adapted for propelling aeroplanes and it is well known that when the aeroplane reaches altitudes where the atmosphere becomes rare it has been impossible in engines as heretofore constructed, to secure sufficient volume of gas to operate the engine efficiently. By my improved engine, I obtain a sufficient volume for all purposes, regardless of atmospheric conditions, and thereby maintain a high volumetric efficiency under all conditions of operation.

Lubricating pipes extend through the hollow crank shaft 5 as indicated at 66, 67 and 68. The oil pipe 66 furnishes oil to the crank shaft connection, while the oil pipe 67 furnishes oil to the ball bearings 13 and the oil pipe 68 furnishes oil to the ball bearings 69, which are located within the end plate 9 between said end plate and the fixed crank shaft 5. The lubricating oil furnished to the crank shaft by the pipe 66 passing out through grooves and openings 33ᵃ in the floating sleeves 33 and 34 and also out through openings 30ᵇ in the cross bars, effectively lubricates all of the parts of the crank shaft. The oil is also carried out through a passage 26ᵃ in the connecting rod to the wrist pin and through oil ports 70 to the wall of the cylinder. The oil from the passage 26ᵃ works through the bearing connection between the pitman and the pin on the piston, and thence is carried by centrifugal force against the head of the cylinder and into the oil ports 70 which open at the inner face of the cylinder. The oil ports 70 are formed in radial ribs 70ᵃ on the piston. These oil ports 70 are located so as to pass the exhaust port as the piston travels. This opens the ends of the oil ports 70 for an instant, permitting the discharge of any surplus deposits and thus maintaining a free flow of the oil to the cylinder wall. At the opposite end of the crank casing from the valve disc 60 is a balance disc 71 which is attached to the fixed crank and prevents end thrust on the end cap 10.

Figure 7:
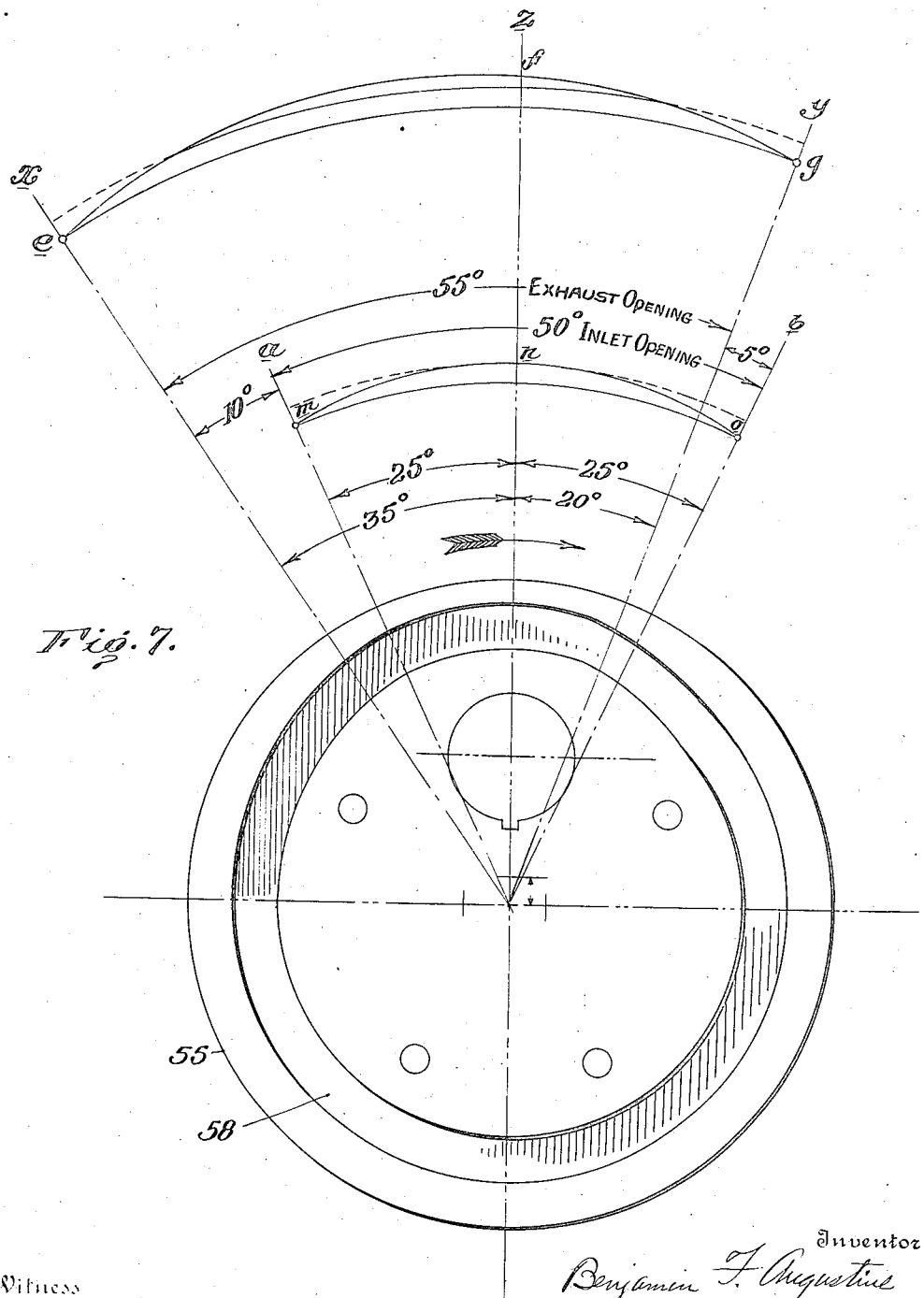
Fig. 7 is a view showing inside elevation, one section of the box cam for operating one side of the sleeve controlling the exhaust ports and showing diagrammatically the time and extent of opening the exhaust ports and the intake ports.

In Fig. 7 of the drawing, I have shown one section of one of the box cams 55 for operating the sleeve 52. The groove 58 in which the roller 57 runs, is concentric to the center of the crank casing from the radial line $y$ to the radial line $x$ in the direction of the arrow. The roller moves in the direction of this arrow and when the radial line $x$ is reached, said roller will be forced outwardly and this will cause the sleeve to move outwardly so as to uncover the exhaust ports. The exhaust ports are open in any one cylinder by the movement of the engine through an angle of about fifty-five degrees and then they are closed. In this figure of the drawing I have shown at the radial line $a$, the point at which the inlet openings begin to uncover and by the radial line $b$ the point at which they are fully closed.

The curved line $e$, $f$, $g$, indicates the extreme extent of movement of the sleeve 52 while the curved line $m$, $n$, $o$, represents the opening of the inlet ports. It will be noted that the inlet ports and also the exhaust ports are wide open when the radial line $z$ is reached. The inlet ports are opened through an angular period of about fifty degrees. From this drawing it will be apparent and as has also been noted above, the exhaust ports are first opened and then after the engine is turned through substantially ten degrees, the associated inlet ports are opened and the exhaust ports are closed before the inlet ports close, the engine moving through an angle of about five degrees before the inlet ports close after the exhaust ports are closed. The relative times at which the inlet ports and exhaust ports are opened may be varied from that described, the essential feature being the closing of the exhaust port for a short interval prior to the closing of the inlet port, so as to produce super-induction of the gases in the cylinder as hereinbefore described.

Each cylinder is provided with at least one spark plug 72. Each spark plug is connected through a suitable conductor 73 with its associated contact 74. A fixed brush 75 engages these contacts in turn and supplies the current for ignition in proper timing to the relative movements of the pistons and cylinders.

In my improved engine the cylinders are fired one after the other in rotation and this enables a very simple ignition system to be used. The contacts 74 are carried by the commutator plate 76 and are disposed so as to be engaged one after the other in rotation by the brush 75. If the engine is provided with six cycles the ordinary two point magneto may be used, driven at a speed of three to one of the engine shaft and this will cause the firing of the cylinders one after the other in rotation, each cylinder firing on each revolution of the engine. It will be noted that the spark plugs 72 are located directly in front of the intake ports and this provides for a complete scavenging of the spark plugs and also insures that the spark plugs will be surrounded by the fresh fuel gases even though the engine may be running under throttled conditions.

It is thought the essential features of my device will be apparent from the above description. It is well understood that in an engine of the character described, wherein the cylinders rotate, the centrifugal force acting on the pistons becomes a decided factor for consideration. Where the opposed pistons are connected to the same fixed crank, these pistons will counter-balance each other, if the centrifugal force operating thereon is undistributed. When however, the explosive force is applied to the outer face of the piston as occurs in the usual engine of the type described, this force of the expanded gas overcomes the centrifugal force operating upon the pistons at that time and thus tends to throw the engine out of balance. By my improved device and arrangement of parts, the expansion chamber is at the inner side of the piston and the force of the expanding gases tends to force the piston outwardly or in the same direction that the centrifugal force acts thereon. In other words, the force of the expanding gases operating upon the piston is added to and works with the centrifugal force operating upon the piston and therefore, this centrifugal force is undistributed and may operate to counter-balance the opposed piston which is not subjected at that time to the expanding gases. It will also be noted that the force of the expanding gases work against the inner end of the cylinder and tend to hold the cylinder seated on the crank casing. Therefore there is no strain on the connections between the cylinder and crank casing through the action of the expanding gases. Furthermore, there is no force of expanding gases against the outer end of the cylinder. The outer end of the cylinder is only subjected to the suction and discharge force in the pumping chamber and therefore, the walls of the cylinder may be made very thin and the engine as a whole very light in weight.

Furthermore, in my improved arrangement of parts, the piston performs the double function of operating the engine through the action of expanding gases thereon and of drawing in and transferring the gases to the crank casing. The gases drawn into the cylinder serve to cool the piston and I therefore, have all the cooling effects of a four cycle engine. The gases drawn into the pumping chamber may be of greater volume than the cubical capacity of the expansion chamber, because the piston area in the pumping chamber is greater than the piston area in the expansion chamber provided of course that the throttle for the carburetor is thrown wide open. Through the handling of this greater volume of gas, I may compress the same in the crank chamber and thus deliver the same to the expansion chamber at a pressure greater than atmospheric pressure if desired. With this control of the pressure of the gases in the crank casing and the closing of the exhaust ports prior to the closing of the intake ports, I am able to effect super-induction and obtain high volumetric efficiency. The sleeve for closing the exhaust ports so far as the expansion chamber is concerned performs only one function and that is of closing the exhaust ports so as to bring about the super-induction in the cylinders as above described. These sleeves do however, perform the function of closing the exhaust ports when said exhaust ports are exposed in the pumping chamber, so that the exhaust ports become ineffective and this permits the outer end of the cylinder to be used as a pumping chamber. The fuel gases will be forced outwardly by centrifugal force and the heavier particles of fuel will be carried past the intake ports into the hot outer ends of the cylindrical portions 21 and there gasified, which insures that only a dry fuel gas will enter the intake ports. The lubricating oil being carried through pipes which extend through the chamber receiving the fuel gases, will be kept cool until it reaches the bearings to which it is to be applied, which insures a perfect volume of lubricating oil on all bearings. The lubricating oil is carried in and about the floating sleeves, the cross bars and the rings connected thereto, into the end cups and out through the piston rod through the cylinder head and the cylinder wall, which insures perfect lubrication of all these parts. The piston having a two point bearing, one at each side of the expansion chamber may be constructed with a relatively small bearing surface, which reduces the friction incident to the travel of the piston and all wear on the cylinder by any side thrust on the piston, is also avoided. The cylinders of the engine may be fired one after the other in rotation and a very simple ignition system can therefore be used in connection with the engine. No complicated distributor is necessary but on the contrary, only a single commutator ring having the spaced contacts connected to the respective spark plugs in the cylinders and a single brush which engages these contacts one after the other in succession and in rotation.

It is obvious that minor changes in the details of construction and the arrangement of parts may be made, without departing from the spirit of the invention as set forth in the appended claims. It will also be obvious that I may provide means for shifting the box cams at will and thus vary the time when the exhaust ports are closed and thereby vary the degree of super-induction in the fuel gases.

Having thus fully described my invention what I claim as new and desire to secure by Letters Patent is:—

1. A gas engine including in combination, a cylinder, a piston in said cylinder, intake ports for said cylinder, means for controlling the same; exhaust ports for said cylinder, means for controlling said exhaust ports whereby the same may be closed prior to the closing of the intake ports, and means for forcibly delivering fuel gas to the cylinder through said intake ports.

2. A rotary gas engine including in combination, a casing, a plurality of radially disposed cylinders carried thereby, a crank located in said casing, a piston in each cylinder, a connecting rod joining each piston to the crank, intake ports for said cylinder, means for controlling the intake ports, exhaust ports for said cylinder, means for controlling said exhaust ports whereby the same may be closed prior to the closing of the intake ports, and means for forcibly delivering fuel gas to the cylinder through said intake ports.

3. A gas engine including in combination, a rotatable casing, a plurality of radially disposed cylinders carried thereby, a fixed crank located in said casing, a piston in each cylinder, a connecting rod joining each piston to the crank, intake ports for each cylinder, means for controlling the intake ports, exhaust ports for each cylinder, means for controlling the said exhaust ports whereby the same may be closed prior to the closing of the intake ports, and reciprocating pumps for forcibly delivering the fuel gases to the cylinder through the intake ports.

4. A gas engine including in combination a rotatable casing, a plurality of radially disposed cylinders carried thereby, a fixed crank located in said casing, a piston in each cylinder, a connecting rod joining the inner face of each piston to the crank, each piston having a cylindrical projecting portion having a sliding gas tight connection with the inner end of the cylinder and housing said connecting rod connection to the piston, whereby the chamber between the piston and the inner end of the cylinder may be utilized as an expansion chamber for the gases operating the engine, said cylindrical projecting portion having inlet openings formed therein for permitting the fuel gases to pass from the crank casing to the expansion chamber.

5. A gas engine including in combination a rotatable casing, a plurality of radially disposed cylinders carried thereby, a fixed crank located in said casing, a piston in each cylinder, a connecting rod joining the inner face of each piston to the crank, each piston having a cylindrical projecting portion having a sliding gas tight connection with the inner end of the cylinder and housing said connecting rod connection to the piston, whereby the chamber between the piston and the inner end of the cylinder may be utilized as an expansion chamber for the gases operating the engine, said cylindrical projecting portion having inlet openings formed therein for permitting the fuel gases to pass from the crank casing to the expansion chamber, and means for screening said inlet openings.

6. A gas engine including in combination a rotatable casing, a plurality of radially disposed cylinders carried thereby, a fixed crank located in said casing, a piston in each cylinder, a connecting rod joining the inner face of each piston to the crank, each piston having a cylindrical projecting portion having a sliding gas tight connection with the inner end of the cylinder and housing said connecting rod connection to the piston, whereby the chamber between the piston and the inner end of the cylinder may be utilized as an expansion chamber for the gases operating the engine, said cylindrical projecting portion having inlet openings formed therein for permitting the fuel gases to pass from the crank casing to the expansion chamber, said cylinder having exhaust ports formed in the wall thereof at the outer end of the cylinder through which the burnt gases are expelled.

7. A gas engine including in combination a cylinder, a piston dividing said cylinder into an inner expansion chamber and an outer pumping chamber, exhaust ports adjacent the outer end of the cylinder, means whereby fuel gases may be drawn into the pumping chamber and expelled therefrom at a point at the outer end of the cylinder and beyond the exhaust ports, a sleeve, means for shifting the sleeve for closing the exhaust ports while the outer end of the cylinder is used as a pumping chamber and for uncovering the exhaust ports while the piston is passing the same, so that said exhaust ports may be uncovered by the piston to release the burnt gases from the cylinder.

8. A gas engine including in combination a cylinder, a piston dividing said cylinder into an inner expansion chamber and an outer pumping chamber, exhaust ports adjacent the outer end of the cylinder, means whereby fuel gases may be drawn into the pumping chamber and expelled therefrom at a point at the outer end of the cylinder and beyond the exhaust ports, a sleeve, means for shifting the sleeve for closing the exhaust ports while the outer end of the cylinder is used as a pumping chamber and for uncovering the exhaust ports while the piston is passing the same, so that said exhaust ports may be uncovered by the piston to release the burnt gases from the cylinder, and means for admitting the fuel gases under pressure at the inner end of the cylinder.

9. A gas engine including in combination a cylinder, a piston for dividing said cylinder into an inner expansion chamber and an outer pumping chamber, exhaust ports adjacent the outer end of the cylinder, means whereby the fuel gases may be drawn into the pumping chamber and expelled therefrom at a point at the outer end of the cylinder and beyond the exhaust ports, a sleeve for covering the exhaust ports while the outer end of the cylinder is used as a pumping chamber, said cylinder having spaced walls between which said sleeve moves and means attached to the sleeve at diametrically opposed points for shifting the same.

10. A gas engine including in combination a cylinder having exhaust ports at its outer end, a sleeve for covering the exhaust ports, said cylinder having spaced walls between which said sleeve moves, devices connected to the sleeve at opposed points for moving the same, a removable cylinder head attached to the outer end of the cylinder, said cylinder head having an inwardly projecting portion formed with an exhaust chamber receiving the gases from the exhaust ports.

11. A gas engine including in combination a cylinder having exhaust ports at its outer end, a cylinder head detachably connected with the cylinder at its outer end, said cylinder head having an inwardly projecting portion formed with an exhaust chamber to receive the gas from the exhaust ports, said inwardly projecting portion being seated against a flange on the cylinder and having a cylindrical wall spaced from the outer wall of the cylinder, a sleeve for controlling the exhaust ports located between the wall on the cylinder head and the outer wall of the cylinder, said wall on the cylinder head being slotted, said sleeve having diametrically disposed ears extending through the slots in the wall, a rod extending along the cylinder and into the exhaust chamber and connected with each ear for shifting the sleeve, nuts on the rod above and below the ears, said cylinder head having an opening adjacent said nuts and a cover plate for said openings.

12. A gas engine including in combination a cylinder having exhaust ports at its outer end, a cylinder head detachably connected with the cylinder at its outer end, said cylinder head having an inwardly projecting portion formed with an exhaust chamber to receive the gas from the exhaust ports, said inwardly projecting portion being seated against a flange on the cylinder and having a cylindrical wall spaced from the outer wall of the cylinder, a sleeve for controlling the exhaust ports located between the wall on the cylinder head and the outer wall of the cylinder, said wall on the cylinder head being slotted, said sleeve having diametrically disposed ears extending through the slots in the wall, a rod extending along the cylinder and into the exhaust chamber and connected with each ear for shifting the sleeve, nuts on the rod above and below the ears, said cylinder head having an opening adjacent said nuts and a cover plate for said openings, said cylinder having radially disposed fins with aligned openings therein through which the rods for operating the sleeve pass and a tubular casing within which said rods operate.

13. A gas engine including in combination a rotatable casing, a plurality of radially disposed cylinders carried thereby, each cylinder having exhaust ports adjacent their outer ends, a sleeve for controlling the exhaust ports, diametrically opposed ears carried by the sleeves, a pair of rods for each sleeve having adjustable connections with each ear and a pair of box cams adapted to operate respectively the rods at each side of the cylinders, said box cams being shaped so as to uncover the exhaust ports in succession.

14. A gas engine including in combination a rotatable casing, a plurality of radially disposed cylinders carried thereby, a piston in each cylinder and dividing the same into an inner expansion chamber and an outer pumping chamber, exhaust ports adjacent the outer end of said cylinder, a sleeve for covering the exhaust ports when the outer end of the cylinder is used as a pumping chamber, rods connected to said sleeve at diametrically opposed points, box cams located within the casing and adapted to operate respectively the rods at each side of the cylinder, intake ports for admitting explosive gases to the expansion chamber, said box cams being shaped so as to shift the sleeve when the piston is covering the exhaust ports whereby the piston may uncover the exhaust ports to release the burnt gases and for shifting said sleeve so as to close the exhaust ports prior to the return travel of the piston, so that super-induction of the gases in the cylinder may be effected.

15. A two cycle gas engine including in combination a cylinder, a piston in said cylinder, intake ports at the inner end of the cylinder, means for controlling the same, exhaust ports at the outer end of the cylinder, means for controlling said exhaust ports whereby the same may be closed prior to the closing of the intake ports and means for delivering the gases to the intake ports under slight pressure.

16. A two cycle gas engine including in combination a cylinder, a piston therein, intake ports for admitting the fuel gases at the inner end of the cylinder, said intake ports being controlled by the travel of the piston, said cylinder having exhaust ports adjacent the outer end thereof uncovered by the piston to release the burnt gases, means independent of the piston for covering the exhaust ports whereby they may be closed prior to the closing of the intake ports and means for delivering the fuel gases to the intake ports under slight pressure.

17. A two cycle gas engine including in combination a rotating casing, a plurality of radially disposed cylinders carried thereby, a fixed crank located in said casing, a piston in each cylinder, a connecting rod joining each piston to the crank, intake ports for admitting fuel gases at the inner end of the cylinders, exhaust ports adjacent the outer ends of the cylinders, means for controlling the intake ports, means for controlling the exhaust ports, whereby the exhaust ports are closed prior to the intake ports and means for delivering fuel gas to the intake ports under slight pressure.

18. A two cycle gas engine including in combination a rotatable casing, a plurality of radially disposed cylinders carried thereby, a piston in each cylinder, intake ports for admitting fuel gases at the inner ends of the cylinders, exhaust ports at the outer ends of the cylinders adapted to be uncovered by the piston to release the burnt gases, and means independent of the piston for covering the exhaust ports prior to the closing of the intake ports.

19. A two cycle gas engine including in combination a rotatable casing, a plurality of radially disposed cylinders carried thereby, a piston in each cylinder, a fixed crank in the casing, a connecting rod joining the piston at its inner face to the crank, said cylinders being constructed so as to form an expansion chamber between the piston and the inner end of the cylinder for the fuel gases operating the engine, intake ports for admitting the gases at the inner end of the cylinder, exhaust ports at the outer end of the cylinder adapted to be uncovered by the piston for releasing the burnt gases, and means independent of the piston for covering the exhaust ports prior to the closing of the intake ports.

20. A two cycle gas engine including in combination a rotatable casing, a plurality of radially disposed cylinders carried thereby, a piston in each cylinder, a fixed crank in the casing, a connecting rod joining the piston at its inner face to the crank, said cylinders being constructed so as to form an expansion chamber between the piston and the inner end of the cylinder for the fuel gases operating the engine, intake ports for admitting the gases at the inner end of the cylinder, exhaust ports at the outer end of the cylinder adapted to be uncovered by the piston for releasing the burnt gases, means independent of the piston for covering the exhaust ports prior to the closing of the intake ports and means for delivering the gases under slight pressure to the intake ports.

21. A two cycle gas engine including in combination a rotatable casing, a plurality of radially disposed cylinders carried thereby, a piston in each cylinder, a fixed crank in the casing, a connecting rod joining the piston at its inner face to the crank, said cylinders being constructed so as to form an expansion chamber between the piston and the inner end of the cylinder for the fuel gases operating the engine, intake ports for admitting the gases at the inner end of the cylinder, exhaust ports at the outer end of the cylinder adapted to be uncovered by the piston for releasing the burnt gases, a sliding sleeve for closing the exhaust ports, means for moving the sleeve away from the exhaust ports so that said exhaust ports are uncovered by the piston to release the burnt gases and for moving the sleeve to uncover the exhaust ports prior to the return travel of the piston and means for supplying fuel gases under slight pressure to the intake ports.

22. A gas engine including in combination a rotatable casing, a fixed crank in the casing, a plurality of radially disposed cylinders carried thereby, a piston in each cylinder, a connecting rod joining each piston at its inner face to the crank, each piston having a cylindrical portion having a sliding gas tight connection with the inner end of the cylinder whereby the cylinder between the piston and the inner end thereof may be utilized as an expansion chamber, said inwardly projecting cylindrical portion having intake ports, each cylinder at the outer end thereof having exhaust ports adapted to be uncovered by the piston to release the burnt gases, means for closing the exhaust ports prior to the closing of the intake ports and means for delivering the gases under pressure to the intake ports.

23. A two cycle gas engine including in combination a rotatable closed casing, a plurality of radially disposed cylinders carried thereby, a piston dividing each cylinder into an inner expansion chamber and an outer pumping chamber and associated devices whereby the gases may be drawn through a carbureter into the pumping chamber and delivered thereby to the closed casing and whereby the gases may be delivered from the closed casing to the expansion chamber.

24. A two cycle gas engine including in combination a rotatable closed casing, a plurality of radially disposed cylinders carried thereby, a piston for dividing each cylinder into an inner expansion chamber and an outer pumping chamber, a fixed crank in the closed casing, a connecting rod joining each piston at its inner face to the crank, intake ports for admitting the fuel gases from the closed casing at the inner end of the cylinders, exhaust ports adjacent the outer end of each cylinder to which the burnt gases are expelled, means for controlling the exhaust ports, means whereby the fuel gases may be drawn from the carburetor into each pumping chamber and delivered therefrom to the closed casing under slight pressure.

25. A two cycle gas engine including in combination a rotatable closed casing, a plurality of radially disposed cylinders carried thereby, a piston for dividing each cylinder into an inner expansion chamber and an outer pumping chamber, a fixed crank in the closed casing, a connecting rod joining each piston at its inner face to the crank, intake ports for admitting the fuel gases from the closed casing at the inner end of the cylinders, exhaust ports adjacent the outer end of each cylinder to which the burnt gases are expelled, means for controlling the exhaust ports, means whereby the fuel gases may be drawn from the carburetor into each pumping chamber and delivered therefrom to the closed casing under slight pressure, each cylinder having a spark plug at the end thereof adjacent the intake ports and means whereby the cylinders may be fired in rotation one after the other.

26. A gas engine including in combination a rotatable casing, a plurality of radially disposed cylinders carried by the casing, a piston in each cylinder, each piston having a cylindrical projecting portion having a sliding gas tight connection with the inner end of the cylinder, said cylindrical projecting portion at its inner side opening into the rotatable casing, a fixed crank in said casing, a connecting rod joining each piston with the crank, said cylindrical projecting portion having intake ports adjacent its inner end whereby the centrifugal force operating on the heavier particles of fuel gases carry the same by the intake ports into the hot outer end of the chamber in said cylindrical portion, so that they may be fully gasified.

27. A two cycle gas engine including in combination a rotatable closed casing, a plurality of radially disposed cylinders, each cylinder having a pumping chamber formed therein, a piston for each pumping chamber, said casing having an end cap at one end thereof with radially disposed passages for connecting the pumping chamber in each cylinder with its associated passage in the end cap, a disc valve for controlling the passages and having a receiving channel for receiving the fuel gases from the carburetor and a discharge channel for delivering the gases to the closed casing, said disc valve having opposed abutments for separating the discharge side of the disc valve from the receiving side thereof, whereby as said casing rotates the pumping chambers will be connected one after the other with the receiving side, while the pistons are drawing in gas and with the discharge side while the pistons are expelling the gases from the pumping chambers.

28. A two cycle gas engine including in combination a rotatable closed casing, a plurality of radially disposed cylinders, each cylinder having a pumping chamber formed therein, a piston for each pumping chamber, said casing having an end cap at one end thereof with radially disposed passages for connecting the pumping chamber in each cylinder with its associated passage in the end cap, a disc valve for controlling the passages and having a receiving channel for receiving the fuel gases from the carburetor and a discharge channel for delivering the gases to the closed casing, said disc valve having opposed abutments for separating the discharge side of the disc valve from the receiving side thereof, whereby as said casing rotates the pumping chambers will be connected one after the other with the receiving side, while the pistons are drawing in gas and with the discharge side while the pistons are expelling the gas from the pumping chambers, said abutments being disposed so as to cross the passages connected with the pumping chambers at the time when the piston is at rest.

29. A two cycle gas engine including in combination a rotatable closed casing, a plurality of radially disposed cylinders, each cylinder having a pumping chamber formed therein, a piston for each pumping chamber, said casing having an end cap at one end thereof with radially disposed passages for connecting the pumping chamber in each cylinder with its associated passage in the end cap, a disc valve for controlling the passages and having a receiving channel for receiving the fuel gases from the carburetor and a discharge channel for delivering the gases to the closed casing, and a wear ring between the disc valve and the end cap, said wear ring having openings registering with the passages in the end cap.

30. A two cycle gas engine including in combination a rotatable closed casing, a plurality of radially disposed cylinders, each cylinder having a pumping chamber formed therein, a piston for each pumping chamber, said casing having an end cap at one end thereof with radially disposed passages for connecting the pumping chamber in each cylinder with its associated passage in the end cap, a disc valve for controlling the passages and having a receiving channel for receiving the fuel gases from the carburetor and a discharge channel for delivering the gases to the closed casing, said disc valve having an outwardly extending flange shaped to engage the inner face of the end cap and a packing between said flange and said end cap.

31. A gas engine including in combination a rotatable casing, a plurality of radially disposed cylinders carried by the casing, a piston in each cylinder dividing the cylinder into an inner expansion chamber and an outer pumping chamber, a fixed shaft about which said casing rotates, a crank carried by the shaft and located in said casing, said casing having an end cap provided with radially disposed passages, one for each cylinder, a pipe connecting each passage with the pumping chamber in its respective cylinder, a disc valve fixed to the shaft for controlling the passages in the end cap, said disc valve having a receiving channel for receiving the fuel gases from the carburetor and a discharge channel for delivering the gases to the casing, said disc valve having a projecting flange overlapping the inner face of the end cap, a disc of substantially the same diameter of said flange connected to the crank at the opposite end of the casing, a packing between said last named disc and the other end cap, said disc operating to counter-balance the end thrust on the disc valve.

32. A gas engine including in combination a rotatable casing including a cylindrical body portion, end caps bolted thereto, a fixed shaft, a ball bearing between one of the end caps and the fixed shaft, said fixed shaft terminating in the other end cap and having a ball bearing between the end cap and the end of the shaft, said shaft having a crank to which the end of the shaft is detachably connected, a driving shaft attached to the end cap adjacent the end of the fixed shaft, a ball bearing journal for said driving shaft, a plurality of radially disposed cylinders carried by the casing, a piston in each cylinder, a connecting rod joining each cylinder to the crank, intake ports for admitting the fuel gases at the inner ends of said cylinders from said casing, exhaust ports at the outer ends of the cylinders, through which the burnt gases are expelled, a spark plug at the inner end of each cylinder and means whereby the cylinders may be fired one after the other in rotation.

33. A gas engine including in combination, a plurality of radially disposed rotating cylinders, a piston in each cylinder, intake and exhaust ports for each cylinder and controlled by the movement of the piston, slidable means independent of the pistons for closing the exhaust ports prior to the closing of the intake ports, and means for delivering fuel gas to the cylinders through the intake ports.

34. A gas engine including in combination, a plurality of radially disposed rotating cylinders, a piston in each cylinder, intake ports for each cylinder, exhaust ports for each cylinder adapted to be controlled by the pistons, and means independent of the piston for closing the exhaust port prior to the closing of the intake ports.

In testimony whereof I affix my signature.

BENJAMIN F. AUGUSTINE.